US010322950B2

(12) United States Patent
Snydacker et al.

(10) Patent No.: US 10,322,950 B2
(45) Date of Patent: Jun. 18, 2019

(54) METHOD FOR LITHIUM EXTRACTION VIA ION EXCHANGE

(71) Applicant: Northwestern University, Evanston, IL (US)

(72) Inventors: David H. Snydacker, Evanston, IL (US); Vinay Ishwar Hegde, Chicago, IL (US); Muratahan Aykol, Moraga, CA (US); Christopher M. Wolverton, Evanston, IL (US)

(73) Assignee: Northwestern University, Evanston, IL (US)

( * ) Notice: Subject to any disclaimer, the term of this patent is extended or adjusted under 35 U.S.C. 154(b) by 208 days.

(21) Appl. No.: 15/420,708

(22) Filed: Jan. 31, 2017

(65) Prior Publication Data

US 2017/0217796 A1    Aug. 3, 2017

Related U.S. Application Data

(60) Provisional application No. 62/330,925, filed on May 3, 2016, provisional application No. 62/289,506, filed on Feb. 1, 2016.

(51) Int. Cl.
| | |
|---|---|
| *C02F 1/00* | (2006.01) |
| *C02F 1/42* | (2006.01) |
| *C22B 26/12* | (2006.01) |
| *C22B 3/42* | (2006.01) |
| *C02F 101/10* | (2006.01) |
| *C02F 103/08* | (2006.01) |

(52) U.S. Cl.
CPC ............... *C02F 1/42* (2013.01); *C22B 3/42* (2013.01); *C22B 26/12* (2013.01); *C02F 2001/425* (2013.01); *C02F 2101/10* (2013.01); *C02F 2103/08* (2013.01); *Y02P 10/234* (2015.11); *Y02W 10/37* (2015.05)

(58) Field of Classification Search
CPC ...... C02F 1/42; C02F 2001/425; C22B 26/12; C22B 3/42; Y02P 10/234
USPC ................... 423/179.1, 181; 210/670–681
See application file for complete search history.

(56) References Cited

U.S. PATENT DOCUMENTS

| | | | |
|---|---|---|---|
| 6,207,126 B1 | 3/2001 | Boryta et al. | |
| 6,749,648 B1 * | 6/2004 | Kumar | B82Y 30/00 |
| | | | 29/623.1 |
| 10,150,056 B2 * | 12/2018 | Snydacker | B01D 15/361 |
| 2011/0203929 A1 * | 8/2011 | Buckley | B01D 61/445 |
| | | | 204/537 |

FOREIGN PATENT DOCUMENTS

WO    WO-2015/121684    *    8/2015

OTHER PUBLICATIONS

CN-104577243 A, abstract only. (Year: 2015).*
CN-103276406 A, abstract only. (Year: 2013).*
CN-87103431 A, abstract only. (Year: 1987).*
KR-20120015658 A, abstract only. (Year: 2012).*
Alberti, G., et al., Crystalline Insoluble Acid Salts of Tetravalent Metals-IX: Thorium Arsenate, a New Inorganic Ion Exchanger Specific for Lithium, J. Inorg. Nucl. Chem. 32, 1970, pp. 1719-1727.
An, J.W., et al., Recovery of lithium from Uyuni salar brine, Hydrometallurgy 117-118, Feb. 16, 2012, pp. 64-70.
Chitrakar, R., et al., Lithium recovery from salt lake brine by H2TiO3, Dalton Trans. 43, Apr. 15, 2014, pp. 8933-8939.
Chitrakar, R., et al., A New Type of Manganese Oxide (MnO2·0.5H2O) Derived from Li1.6Mn1.6O4 and Its Lithium Ion-Sieve Properties, Chem. Mater. 12, Sep. 23, 2000, pp. 3151-3157.
Chitrakar, R., et al., Selective Uptake of Lithium Ion from Brine by H1.33Mn1.67O4 and H1.6Mn1.6O4, Chem. Lett. 41, Sep. 13, 2012, pp. 1647-1649.
Endres, P., et al., Extraction of lithium from spinel phases of the system Li1+xMn2-xO4-d, Journal of Power Sources 69:1-2, Nov.-Dec. 1997, pp. 145-156.
Harland, C.E., Ion Exchange Theory and Practice (Second Edition), Royal Society of Chemistry Paperbacks, 1994, pp. 1-280, Table of Contents only.
Hoshino, T., Innovative lithium recovery technique from seawater by using world-first dialysis with a lithium ionic superconductor, Desalination 359, Dec. 29, 2014, pp. 59-63.
Hoshino, T., Lithium Recovery Technology for Stably Supplying Fuel to Fusion Reactors: World-First Dialysis Technique for Lithium Recovery from Seawater, JAEA R&D Review, 2015, pp. 116.
Hui, et al., Preparation of new lithium adsorbents (English abstract), Inorganic Chemicals Industry , Feb. 2014.
Jiang, Jinhe, Synthesis of Spinel Li2MnO3 and Its Ion-exchange Property for Li+, Advanced Materials Research 554-556, Jul. 2012, pp. 860-863.
Kirklin, S., et al., The Open Quantum Materials Database (OQMD): assessing the accuracy of DFT formation energies, NPJ Computational Materials 1, Dec. 11, 2015, pp. 15010.

(Continued)

*Primary Examiner* — Steven J Bos
(74) *Attorney, Agent, or Firm* — Bell & Manning, LLC

(57) ABSTRACT

Methods for extracting lithium from solutions containing lithium ions via reversible cation exchange with $H^+$ are provided. The methods utilize metal oxide or metalloid oxide cation exchange materials having an active sublattice that preferentially bind $Li^+$ cations, relative to both $H^+$ and $Na^+$, in a sample solution and preferentially bind $H^+$, relative to $Li^+$, in an acidic solution.

20 Claims, 20 Drawing Sheets

(56) References Cited

OTHER PUBLICATIONS

Kitajou, A., et al., Selective Recovery of Lithium From Seawater Using a Novel MnO2 Type Adsorbent II—Enhancement of Lithium Ion Selectivity of the Adsorbent , Ars Separatoria Acta 2, 2003, pp. 97-106.
Meshram, P., et al., Extraction of lithium from primary and secondary sources by pre-treatment, leaching and separation: A comprehensive review, Hydrometallurgy 150, Oct. 23, 2014, pp. 192-208.
Onodera, Y., et al., Preparation Method and Lithium Adsorption Property of [?]-MnO2-Silica Composite, Chemistry Letters, 1990, pp. 1801-1804.
Ooi, K., et al., Mechanism of Li+ Insertion in Spinel-Type Manganese Oxide. Redox and Ion-Exchange Reactions, Langmuir 7, 1991, pp. 1167-1171.
Saal, J.E., et al., Materials Design and Discovery with High-Throughput Density Functional Theory: The Open Quantum Materials Database (OQMD), JOM 65:11, Sep. 28, 2013, pp. 1501-1509.
Swain, B., Recovery and recycling of lithium: A review, Separation and Purification Technology 172, Aug. 30, 2016, pp. 388-403.
Umeno, A., et al., Preparation and Adsorptive Properties of Membrane-Type Adsorbents for Lithium Recovery from Seawater, Ind. Eng. Chem. Res. 41, Jul. 27, 2002, pp. 4281-4287.
Xiao, G., et al., Adsorption and Desorption Behavior of Lithium Ion in Spherical PVC-MnO2 Ion Sieve, Industrial and Engineering Chemistry Research 51, Jan. 10, 2012, pp. 10921-10929.
Zhu, G., et al., Adsorption and desorption properties of Li+ on PVC-H1.6Mn1.6O4 lithium ion-sieve membrane, Chemical Engineering Journal 235, Sep. 25, 2013, pp. 340-348.

\* cited by examiner

METHOD FOR LITHIUM EXTRACTION VIA ION EXCHANGE

CROSS-REFERENCE TO RELATED APPLICATIONS

The present application claims priority to U.S. provisional patent application No. 62/289,506, filed Feb. 1, 2016 and to U.S. provisional patent application No. 62/330,925, filed May 3, 2016, the entire contents of which are hereby incorporated by reference.

REFERENCE TO GOVERNMENT RIGHTS

This invention was made with government support under DMR1309957 awarded by the National Science Foundation and DEFG02-07ER46433 awarded by the Department of Energy. The government has certain rights in the invention.

BACKGROUND

Portable electronics, electric vehicles, and stationary electricity storage drive demand for rechargeable batteries with high energy densities. Batteries that use Li as a mobile ion have dominated these markets. Lithium ion batteries deliver a combination of energy, power, lifespan, safety, and affordability. Therefore, the growth of rechargeable batteries with high energy densities is linked to the availability of Li.

Most global Li resources are found in brines. The conventional method for extracting Li from a brine comprises a sequence of steps to remove various elements from the brine prior to precipitation of $Li_2CO_3$. (e.g., P. Meshram, B. D. Pandey and T. R. Mankhand, *Hydrometallurgy*, 2014, 150, 192-208.) First, the brine is concentrated through solar evaporation to precipitate NaCl and KCl. Next, Mg, Ca, and other impurities are removed from the brine through a variety of separation processes. (e.g., J. W. An, D. J. Kang, K. T. Tran, M. J. Kim, T. Lim and T. Tran, *Hydrometallurgy*, 2012, 117-118, 64-70.) Finally, Li is precipitated as $Li_2CO_3$ by addition of soda ($Na_2CO_3$).

Li ion exchange is an alternative process for extracting Li from brines. In this approach, Li is selectively removed from a brine in the presence of other elements; therefore, various steps to remove other elements from the brine are avoided. The Li ion exchange process is based on materials that can absorb and release Li according to changes in pH. When pH is low, these materials absorb H and release Li. When pH is high, the materials absorb Li and release H.

A limited variety of compounds for Li ion exchange have been demonstrated. Li extraction from brines has been demonstrated using $LiMn_2O_4$, $Li_{4/3}Mn_{5/3}O_4$, $Li_{1.6}Mn_{1.6}O_4$, and $Li_2TiO_3$. (See, K. Ooi, Y. Miyai and J. Sakakihara, *Langmuir*, 1991, 7, 1167-1171; A. Umeno, Y. Miyai, N. Takagi, R. Chitrakar, K. Sakane and K. Ooi, *Ind. Eng. Chem. Res.*, 2002, 41, 4281-4287; R. Chitrakar, H. Kanoh, Y. Miyai and K. Ooi, *Chem. Mater.*, 2000, 12, 3151-3157; and R. Chitrakar, Y. Makita, K. Ooi and A. Sonoda, *Dalton Trans.*, 2014, 43, 8933.)

SUMMARY

Methods for extracting lithium from solutions containing lithium ions via reversible cation exchange with $H^+$ are provided.

One embodiment of a method for extracting lithium ions from a solution includes: (a) contacting a hydrogenated cation exchange material with a sample solution comprising lithium cations, whereby lithium cations undergo cation exchange with hydrogen in the hydrogenated cation exchange material to form a lithiated cation exchange material; (b) contacting the lithiated cation exchange material with an acidic solution, whereby hydrogen ions in the acidic solution undergo cation exchange with lithium ions of the lithiated cation exchange material, thereby regenerating the hydrogenated cation exchange material and releasing lithium ions into the acidic solution; and (c) separating the released lithium ions from the acidic solution. The lithiated cation exchange materials comprise $Li_2MnO_3$, $Li_4TiO_4$, $Li_4Ti_5O_{12}$, $Li_7Ti_{11}O_{24}$, $LiTiO_2$, $LiAlO_2$, $LiCuO_2$, $Li_2SnO_3$, $Li_2FeO_3$, $Li_3VO_4$, $Li_2Si_3O_7$, $LiFePO_4$, $Li_2CuP_2O_7$, $Li_4Ge_5O_{12}$, $Li_4GeO_4$, or a mixture of two or more thereof.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

In FIGS. 1-6, if a compound is above or below a solution, then that compound will selectively absorb H or Li, respectively, from that solution.

FIG. 2. Graph of the activity thresholds for Li—H ion exchange for $Li_3Cu_2O_4$, $LiCuO$, $Li_2CuO_3$, $Li_8Cu_4O_{11}$, $Li_2CuO_2$, $LiCuO_2$, and $LiCu_2O_2$ compounds in equilibrium with brine, seawater, and HCl solutions.

FIG. 3. Graph of the activity thresholds for Li—H ion exchange for $Li_2MnO_2$, $Li_6MnO_4$, $Li_{11}Mn_2O_8$, $Li_8Mn_4O_{11}$, $Li_3Mn_2O_6$, $Li_2MnO_3$, $Li_4Mn_5O_{12}$, $LiMn_2O_4$, and $LiMnO_2$ compounds in equilibrium with brine, seawater, and HCl solutions.

FIG. 4. Graph of the activity thresholds for Li—H ion exchange for $Li_8Sn_4O_{11}$, $Li_8SnO_6$, and $Li_2SnO_3$ compounds in equilibrium with brine, seawater, and HCl solutions.

FIG. 5. Graph of the activity thresholds for Li—H ion exchange for $Li_8Ti_4O_{11}$, $LiTiO_2$, $Li_2TiO_3$, $Li_4TiO_4$, $Li_4Ti_5O_{12}$, $Li_7Ti_{11}O_{24}$, $Li_3Ti_2O_6$, and $LiTi_2O_4$ compounds in equilibrium with brine, seawater, and HCl solutions.

FIG. 6. Graph of the activity thresholds for Li—H ion exchange for $Li_8V_4O_{11}$, $Li_2V_{18}O_{39}$, $Li_2VO_3$, $Li_4V_3O_8$, $Li_3VO_4$, $LiV_2O_5$, $LiVO_3$, $LiV_3O_8$, $LiV_2O_4$, and $LiVO_2$ compounds in equilibrium with brine, seawater, and HCl solutions.

In FIGS. 7-12, if a compound is above or below a solution, then that compound will selectively absorb Na or Li, respectively.

FIG. 8. Graph of the activity thresholds for Li—Na ion exchange for $Li_3Cu_2O_4$, $LiCuO$, $Li_2CuO_3$, $Li_8Cu_4O_{11}$, $Li_2CuO_2$, $LiCuO_2$, and $LiCu_2O_2$ compounds in equilibrium with brine and seawater.

FIG. 9. Graph of the activity thresholds for Li—Na ion exchange for $Li_2MnO_2$, $Li_6MnO_4$, $Li_{11}Mn_2O_8$, $Li_8Mn_4O_{11}$, $Li_3Mn_2O_6$, $Li_2MnO_3$, $Li_4Mn_5O_{12}$, $LiMn_2O_4$, and $LiMnO_2$ compounds in equilibrium with brine and seawater.

FIG. 10. Graph of the activity thresholds for Li—Na ion exchange for $Li_8Sn_4O_{11}$, $Li_8SnO_6$, and $Li_2SnO_3$ compounds in equilibrium with brine and seawater.

FIG. 11. Graph of the activity thresholds for Li—Na ion exchange for $Li_8Ti_4O_{11}$, $LiTiO_2$, $Li_2TiO_3$, $Li_4TiO_4$, $Li_4Ti_5O_{12}$, $Li_7Ti_{11}O_{24}$, $Li_3Ti_2O_6$, and $LiTi_2O_4$ compounds in equilibrium with brine and seawater.

FIG. 12. Graph of the activity thresholds for Li—Na ion exchange for $Li_8V_4O_{11}$, $Li_2V_{18}O_{39}$, $Li_2VO_3$, $Li_4V_3O_8$, $Li_3VO_4$, $LiV_2O_5$, $LiVO_3$, $LiV_3O_8$, $LiV_2O_4$, and $LiVO_2$ compounds in equilibrium with brine and seawater. (In FIGS. 1 through 12, activity thresholds for ion exchange are represented by lines. Lines are solid for Li-M-O compounds that are stable and are dashed for Li-M-O compounds that are unstable (but within 0.1 eV/atom of the stable ground state).)

In FIGS. 15 and 16, if a compound is above or below a solution, then that compound will selectively absorb H or Li, respectively, from that solution.

FIG. 16. Graph of the activity thresholds for Li—H ion exchange for $LiFePO_4$ and $LiFeP_2O_7$ compounds in equilibrium with brine, seawater, and HCl solutions. In the graph, the lines for $LiFePO_4$ and $LiFeP_2O_7$ are nearly overlapping.

In FIGS. 17 and 18, if a compound is above or below a solution, then that compound will selectively absorb Na or Li, respectively.

FIG. 18. Graph of the activity thresholds for Li—Na ion exchange for $LiFePO_4$ and $LiFeP_2O_7$ compounds in equilibrium with brine and seawater. In FIGS. 15-18, activity thresholds for ion exchange are represented by lines. Lines are solid for Li-M-P—O compounds that are stable and are dashed for Li-M-P—O compounds that are within 0.1 eV/atom of the stable ground state.

DETAILED DESCRIPTION

Figure 1:
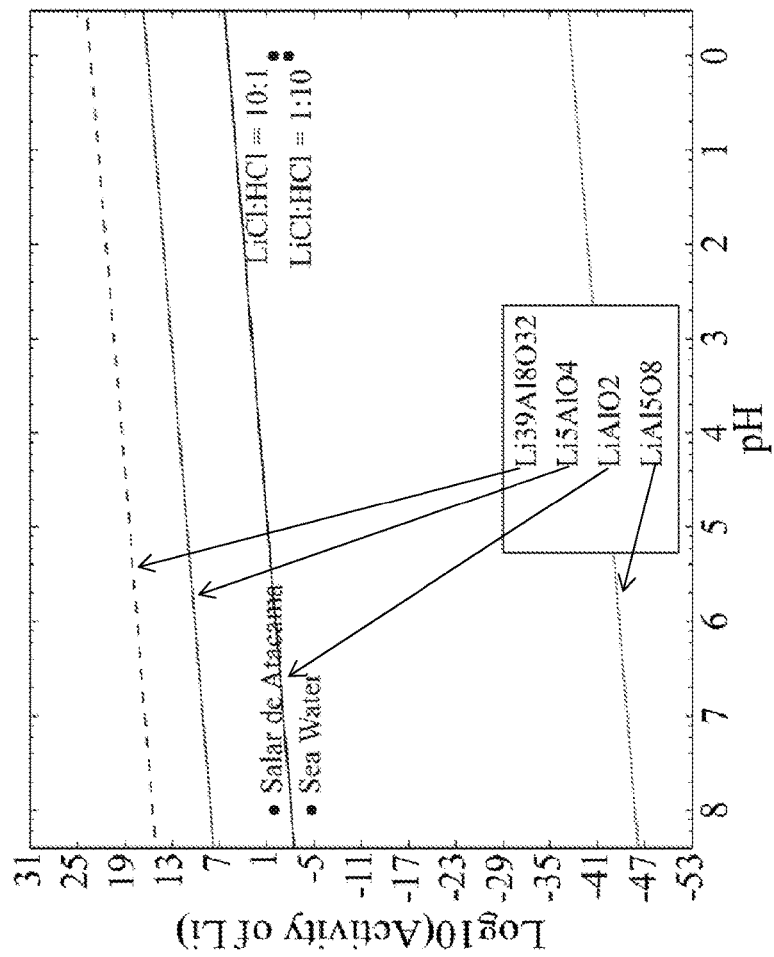
FIG. 1. Graph of the activity thresholds for Li—H ion exchange for $Li_{39}Al_8O_{32}$, $Li_5AlO_4$, $LiAlO_2$, and $LiAl_5O_8$ compounds in equilibrium with brine, seawater, and HCl solutions.
Figure 2:
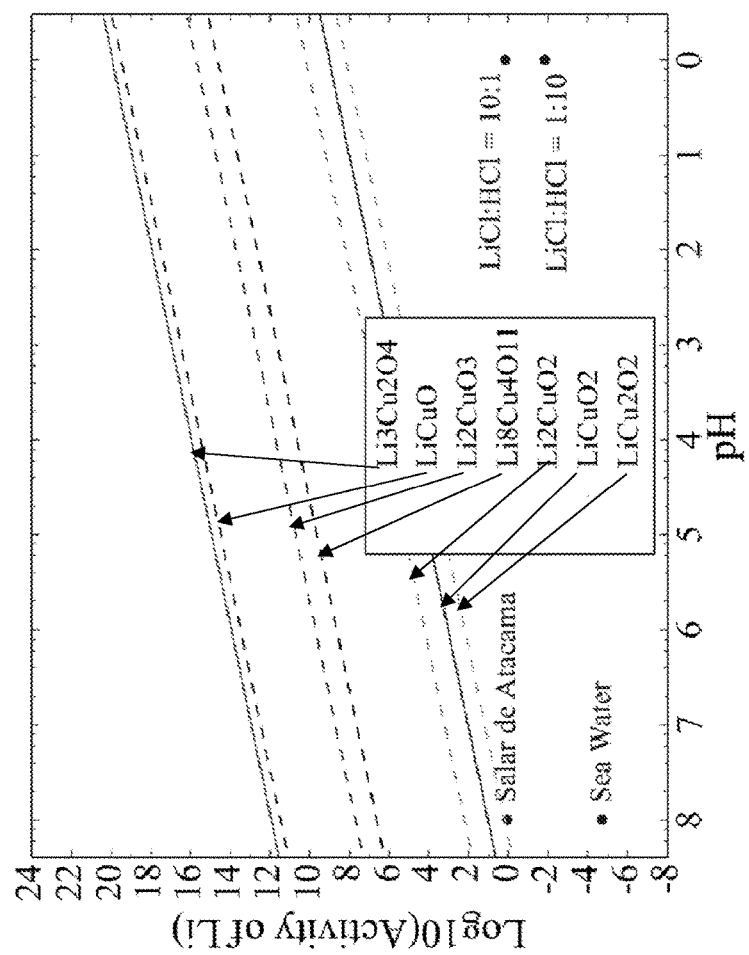
Figure 3:
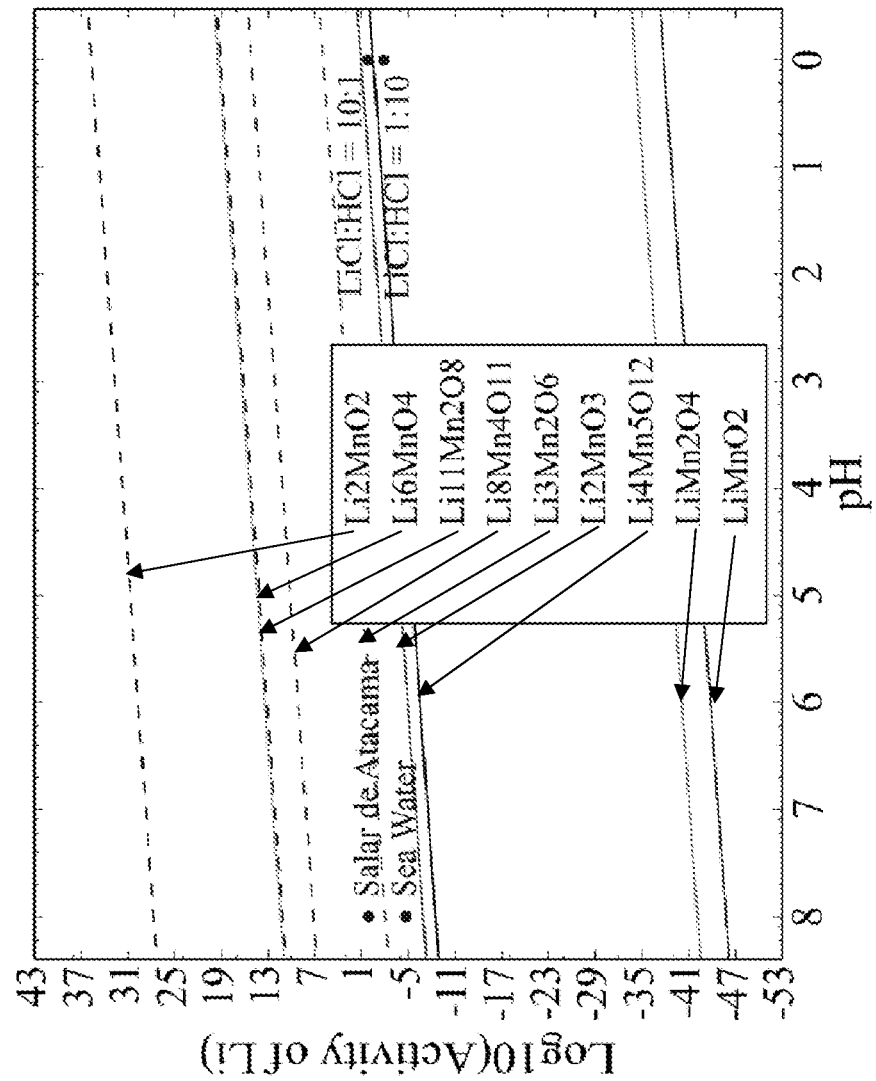
Figure 4:
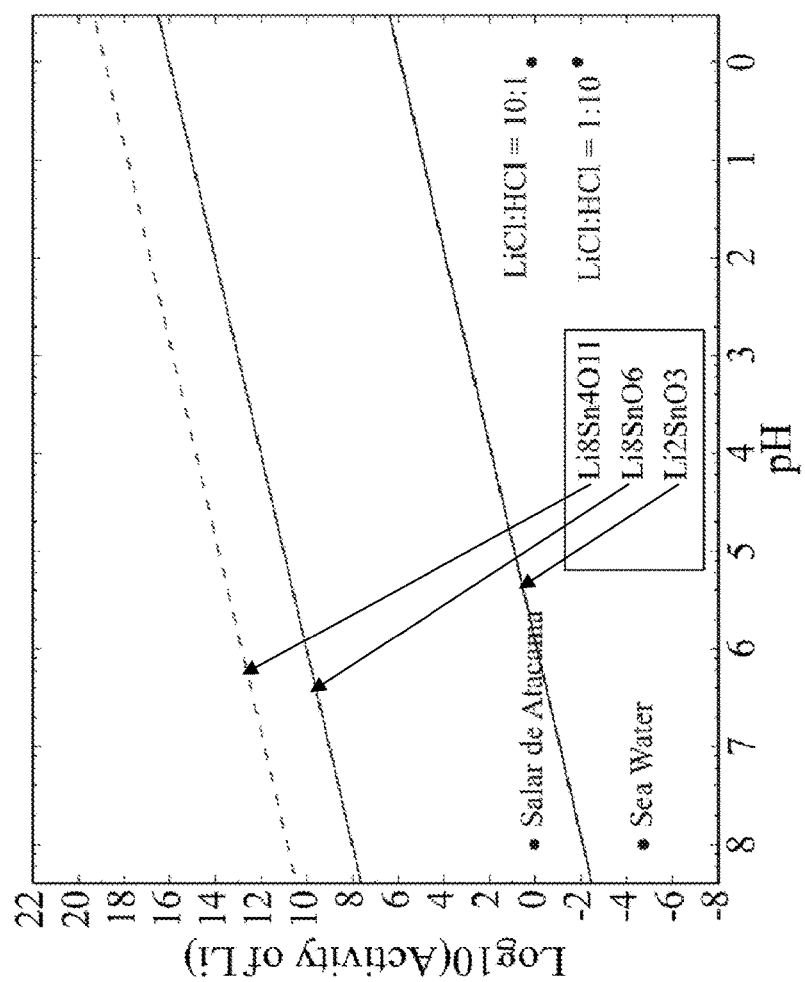
Figure 5:
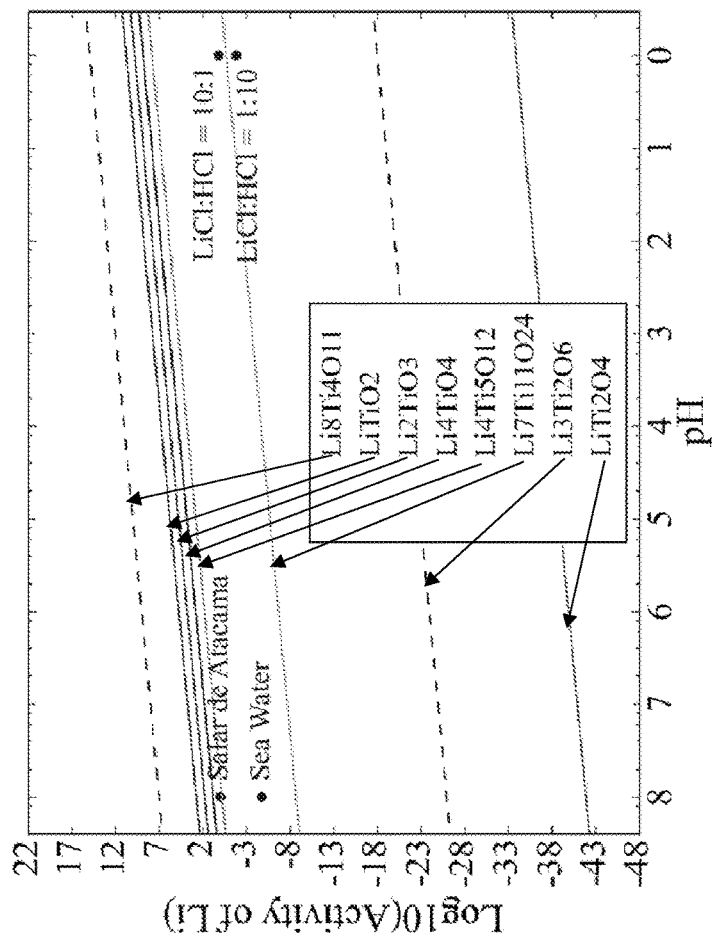
Figure 6:
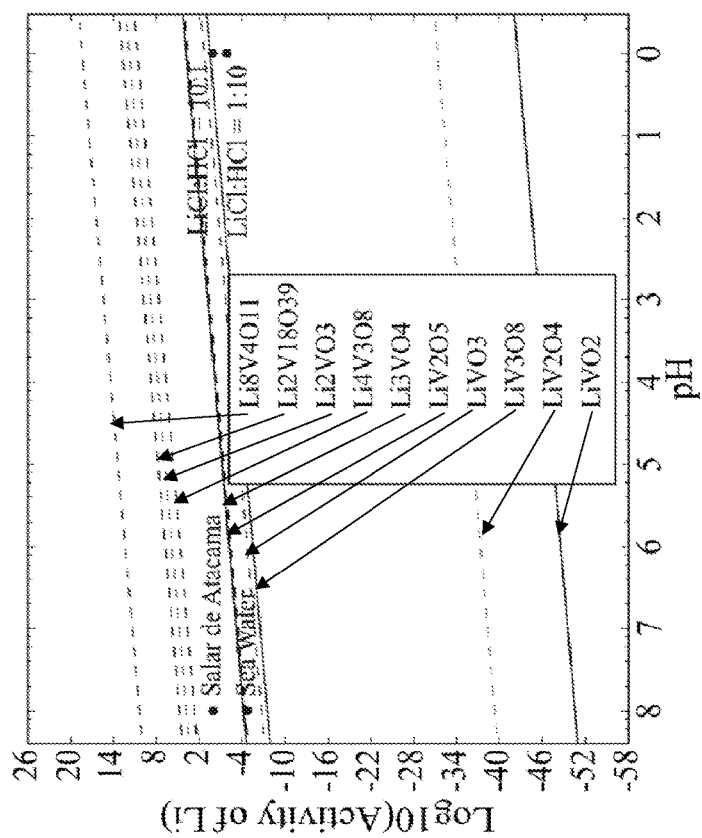
Figure 7:
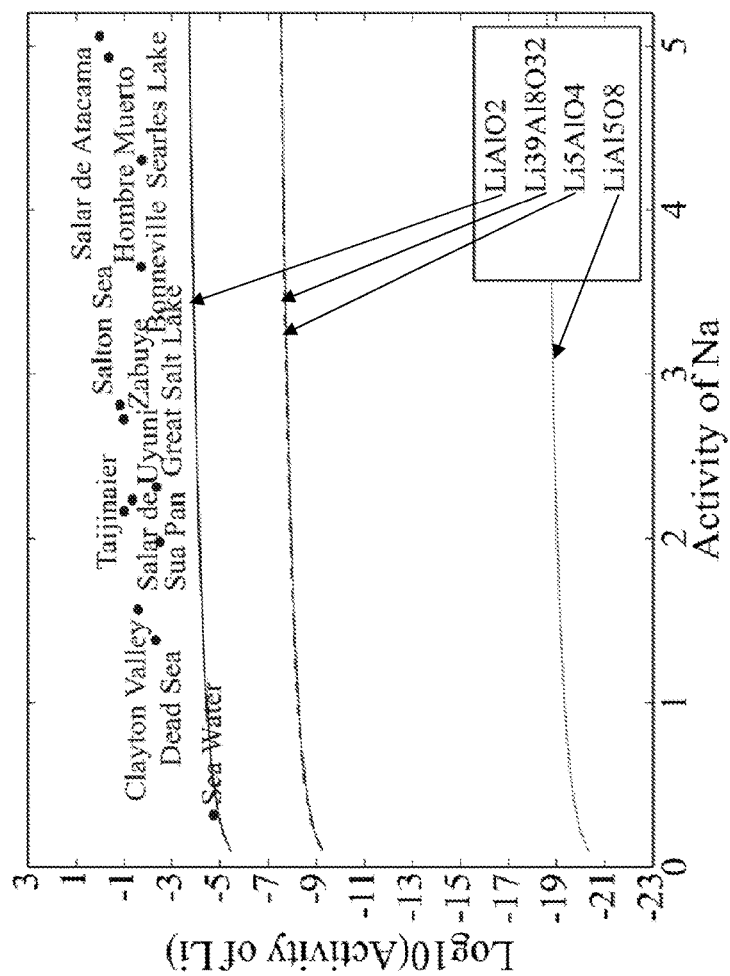
FIG. 7. Graph of the activity thresholds for Li—Na ion exchange for $Li_{39}Al_8O_{32}$, $Li_5AlO_4$, $LiAlO_2$, and $LiAl_5O_8$ compounds in equilibrium with brine and seawater.
Figure 8:
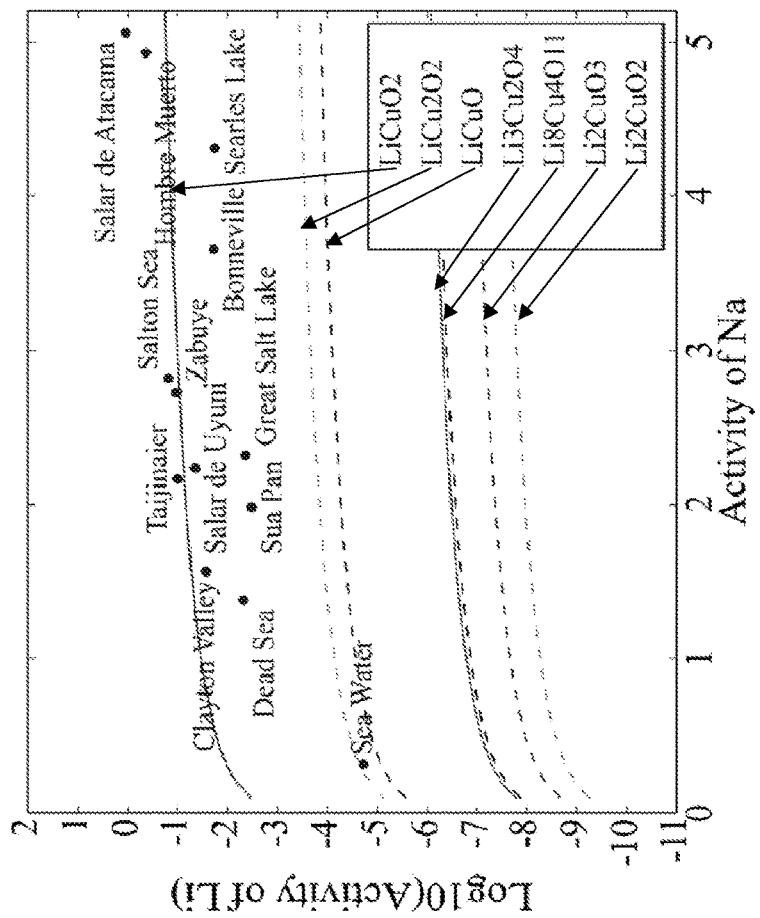
Figure 9:
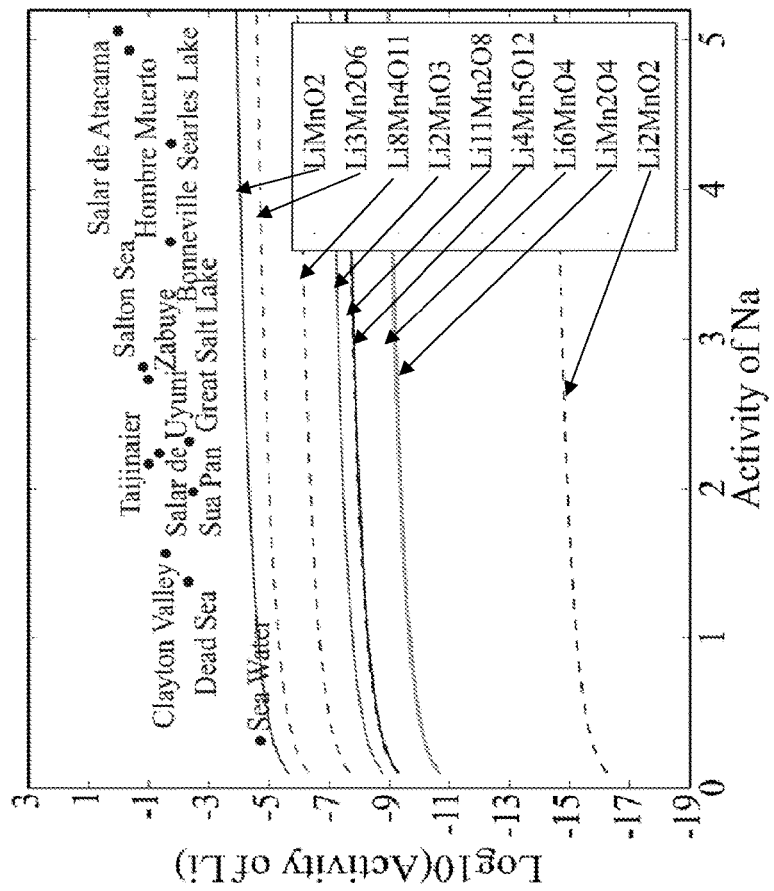
Figure 10:
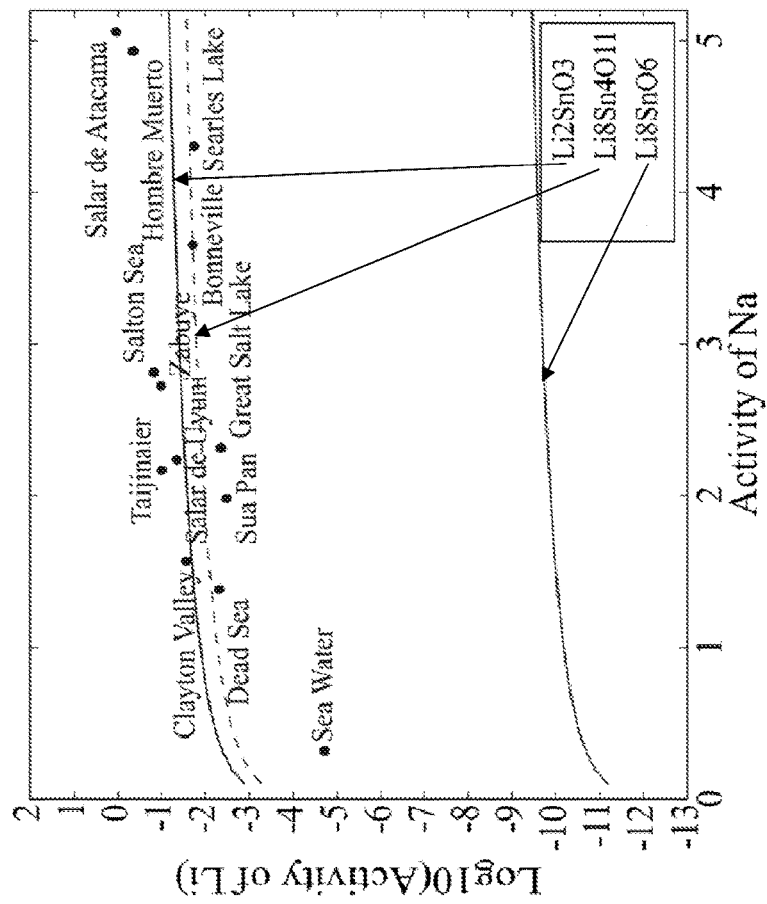
Figure 11:
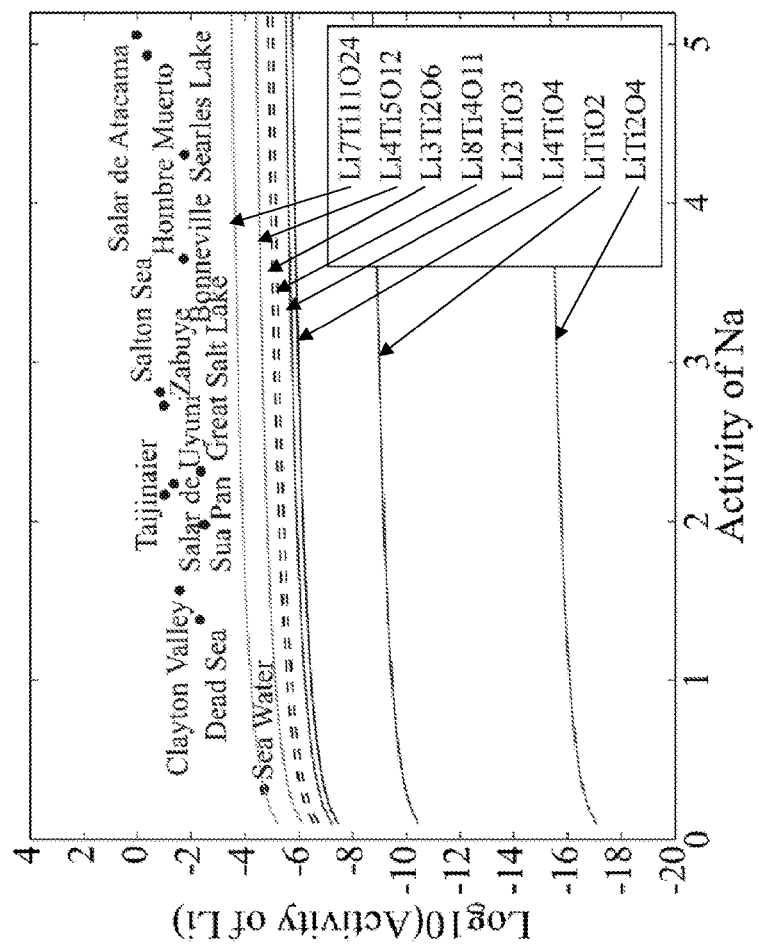
Figure 12:
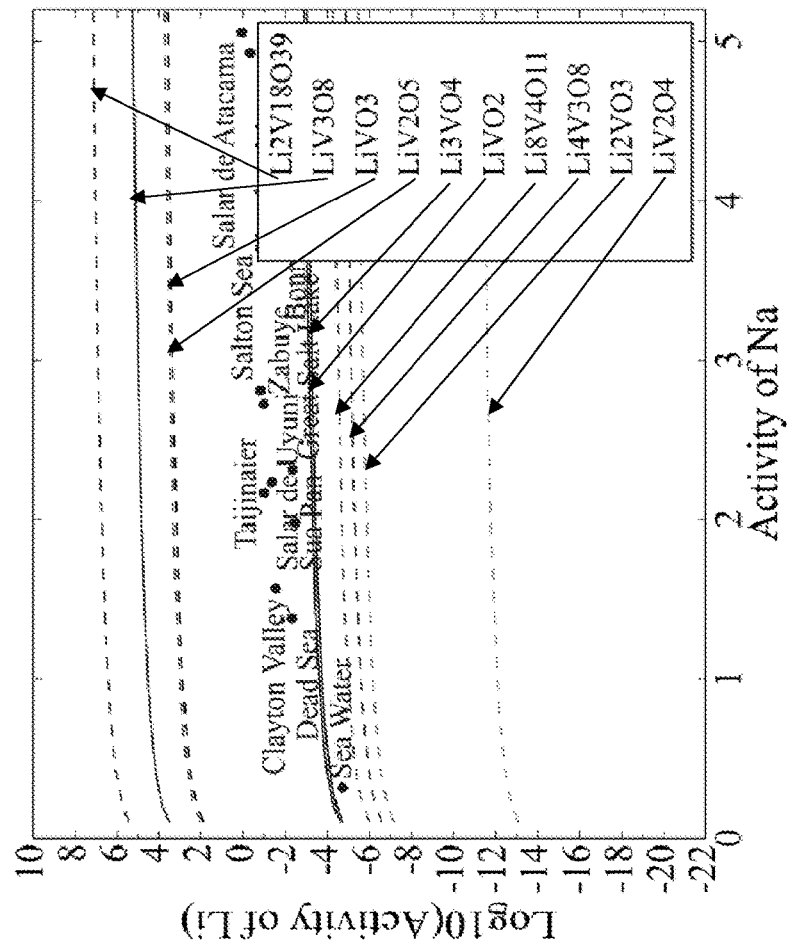

Methods for extracting lithium from solutions containing lithium ions via reversible cation exchange with $H^+$ are provided. The methods can be used to recover lithium from samples, such as natural and processed brine and salt water from natural bodies of water, including seas, oceans, and salt lakes, and also from man-made waste waters, such as waste waters from industrial processing plants. The methods utilize inorganic cation exchange materials having an active sublattice that preferentially bind $Li^+$ cations, relative to both $H^+$ and $Na^+$, in a sample solution and preferentially bind $H^+$, relative to $Li^+$, in an acidic solution. The Li selectivity of the materials relative to Na is especially advantageous because Na is typically present in brines at high concentrations and is similar to Li in chemistry and mobility. The lithium concentration in brines may range, for example, from approximately 0.1 ppm (sea water) to approximately 10,000 ppm (concentrated LiCl solution). By way of illustion, a typical ion exchange process may use a brine with a lithium concentration in range from 10 ppm to 3,000 ppm.

Typically, the cation exchange materials are synthesized with their sublattice fully occupied by Li atoms. These lithiated cation exchange materials can be activated with an acidic solution to form a hydrogenated state, as described in the Examples. In the hydrogenated state, the Li sublattice is fully or partially occupied with H atoms. The hydrogenated materials then can be contacted with a lithium ion-containing solution, such as brine (pH≈8), wherein the materials release H and absorb Li from the solution. The cycle repeats when the lithiated materials are again treated with an acidic solution to regenerate the hydrogenated state and yield lithium in solution.

Thus, one embodiment of a method for extracting lithium from a solution includes: contacting a hydrogenated cation exchange material with a sample solution comprising lithium cations, whereby lithium cations undergo cation exchange with hydrogen in the hydrogenated cation exchange material to form a lithiated cation exchange material; and contacting the lithiated cation exchange material with an acidic solution, whereby hydrogen ions in the acidic solution undergo cation exchange with lithium ions of the lithiated cation exchange material, releasing lithium ions into the acidic solution. The lithium ions that have been released into the solution can then be separated from the solution.

The cation exchange materials comprise ternary and quaternary metal oxides or metalloid oxides, some of which have a nominal 4+ charge on their metal or metalloid atoms. The lithiated cation exchange materials include $Li_2MnO_3$, $Li_4TiO_4$, $Li_4Ti_5O_{12}$, $Li_7Ti_{11}O_{24}$, $LiTiO_2$, $LiAlO_2$, $LiCuO_2$, $Li_2SnO_3$, $Li_2FeO_3$, $Li_3VO_4$, $Li_2Si_3O_7$, $LiFePO_4$, $Li_2CuP_2O_7$, $Li_4Ge_5O_{12}$, and $Li_4GeO_4$. Notably, these compounds include those that do not contain manganese or titanium. Methods of making these compounds are known and many of them have been used as electrode active materials and/or coating materials in lithium ion batteries. For example, $Li_2MnO_3$, $Li_4Ti_5O_{12}$, $LiAlO_2$, $LiFePO_4$, and others have been used in lithium-ion batteries as electrode and/or electrode coating materials. By way of further illustration, $Li_2FeO_3$ has been synthesized (e.g., Teixeira, S. S., Graça, M. P. F. & Costa, L. C. Dielectric, morphological and structural properties of lithium ferrite powders prepared by solid state method. *Journal of Non-Crystalline Solids* 358, 1924-1929 (2012)). It can be prepared from a Li—Fe—O precursor with an approximately 2:1 ratio of Li:Fe by heating the precursor to approximately 1,400 degrees C. to form $Li_2FeO_3$. $Li_7Ti_{11}O_{24}$ has been prepared experimentally with an approximate composition of $Li_{0.57}Ti_{0.86}O_2$. This compound can be prepared from a Li—Ti—O precursor with an approximate ratio of 7:11 Li:Ti by heating the precursor to above 950° C.

The sample solution is simply a solution—typically an aqueous solution—from which lithium is to be fully or partially removed. The sample solution can be derived from a natural source or a man-made source. The sample solution should, at least initially, have a pH that is sufficiently high to promote ion exchange between the protons of the hydrogenated cation exchange material and the lithium ions in solution. Generally, the sample solution will have a near-neutral or alkaline pH. For example, the sample solution may have a pH of at least 6. This includes sample solutions having a pH or at least 7, at least 8, at least 9, and at least 10. As the reaction proceeds, the pH of the solution will decrease. However, the ion exchange reaction may continue to some degree even at fairly low pH values (e.g., ~2) in some cases.

The cation exchange materials can be provided in a variety of forms, including as powders, films, and membranes. The cation exchange materials can be provided on a support substrate, but a support substrate is not required. Contacting the cation exchange materials with a solution may entail, for example, dispersing a powder of the cation exchange materials in the solution, immersing a film or piece of the cation exchange material in the solution, and/or flowing the solution over and/or through the cation exchange material. By way of illustration only, the cation exchange material can be housed in a column and the solution can be flowed through the column.

Once a sufficient degree of $H^+/Li^+$ exchange has occurred, the lithiated cation exchange material can be removed from contact with the sample solution and contacted with an acidic solution having a sufficiently low pH to promote ion exchange between the Li ions of the lithiated cation exchange material and protons in the acidic solution. Typically, the acidic solution will have a pH of no greater than about 3. In this manner, the hydrogenated cation exchange material is regenerated and lithium ions are released into the solution, from which they can be recovered. For example, the released lithium ions may form lithium salts with one or more anions present in the acidic solution, or with one or more anions, such as $CO_3^{2-}$, that are added to the solution following acid elution. The salts can then be precipitated out of, and separated from, the solution.

In some embodiments of the methods, the acid solution is a hydrochloric acid (HCl) solution. In these embodiments, hydrogenation of the cation exchange material yields LiCl in solution. This LiCl then can be precipitated out of the solution or can be converted through addition of $Na_2CO_3$, or other carbonate source, to $Li_2CO_3$, which can be precipitated out of solution. Li desorption desirably occurs with a small excess of the acid to facilitate LiCl elution and precipitation. The LiCl solution also could be further processed into other raw materials, such as LiCl, LiOH, or $Li_2CO_3$. In some embodiments, the acidic solution may be prepared for an electrolysis step to form LiOH through electrolysis. Other acids, including organic and inorganic acids can also be used for lithium recovery. For example, the acidic solution can include hydrochloric acid, sulfuric acid, phosphoric acid, hydrobromic acid, chloric acid, perchloric acid, nitric acid, formic acid, acetic acid, or combinations of two or more thereof. The formation of the lithium salts may neutralize any remaining acid prior to the precipitation and separation of the salt. Therefore, the step of separating the lithium (in the form of a salt) from the acidic solution also refers to the removal of the lithium for a formally acidic solution.

EXAMPLES

Example 1

In this example, density functional theory was used, combined with specific ion interaction theory to identify Li ion exchange materials for Li extraction from brines and seawater. This search was performed using high-throughput computation combined with a large database of hundreds of thousands of inorganic compounds. First, a set of lithium metal oxides and lithium metalloid oxides ("Li-M-O") compounds was searched for, which are thermodynamically stable (or nearly so). For each compound, the reaction energy for Li—H exchange was calculated. This allowed the identification of compounds that undergo Li—H exchange within a target pH window. Reaction energies for Li—Na exchange were also calculated, and compounds that are selective for Li relative to Na were identified. Solute concentrations for a variety of brine, seawater, and HCl solutions were used to calculate Li and Na activities and thereby set targets for reaction energies. Using a first-principles high-throughput screening strategy, nine compounds that are most useful for Li extraction from brines were identified, and an additional four compounds that are useful when brine pH is adjusted to 10 were identified. Four of these compounds are also useful for Li extraction from seawater. The lists of useful materials included two compounds, $Li_4Mn_5O_{12}$ and $Li_2TiO_3$, which had previously been shown through experiments to be promising for lithium extraction. (See, A. Umeno, Y. Miyai, N. Takagi, R. Chitrakar, K. Sakane and K. Ooi, *Ind. Eng. Chem. Res.*, 2002, 41, 4281-4287; R. Chitrakar, Y. Makita, K. Ooi and A. Sonoda, *Dalton Trans.*, 2014, 43, 8933.) This identification of known materials helped to validate the computational approach that was used in this Example. The remaining compounds represented a significant expansion in the variety of ion exchange materials for lithium extraction.

The Open Quantum Materials Database (OQMD) was used to identify compounds that can perform Li ion exchange for Li extraction from brines and seawater. (See, J. E. Saal, S. Kirklin, M. Aykol, B. Meredig and C. Wolverton, *JOM,* 2013, 65, 1501-1509; S. Kirklin, J. E. Saal, B. Meredig, A. Thompson, J. W. Doak, M. Aykol, S. Rühl and C. Wolverton, *Nature Publishing Group,* 2015, 1, 1-15.) The OQMD is a database of inorganic materials containing approximately 400,000 compounds. All ternary Li-M-O (M=Al, B, Cu, Fe, Ga, Ge, Mn, Sc, Si, Sn, Ti, V, Y, Zn, Zr) compounds in the OQMD were considered, which totaled 243 compounds. The metals M in Li-M-O were selected for their low toxicity and proximity in the periodic table to metals in known ion exchange materials. Three additional structures for $Li_4Mn_5O_{12}$, $Li_4Ti_5O_{12}$, and $Li_7Ti_{11}O_{24}$ were included from the Materials Project database. (See, A. Jain, S. P. Ong, G. Hautier, W. Chen, W. D. Richards, S. Dacek, S. Cholia, D. Gunter, D. Skinner, G. Ceder and K. A. Persson, *APL Mater.,* 2013, 1, 011002; S. P. Ong, L. Wang, B. Kang and G. Ceder, *Chem. Mater.,* 2008, 20, 1798-1807; A. Jain, G. Hautier, S. P. Ong, C. J. Moore, C. C. Fischer, K. A. Persson and G. Ceder, *Phys. Rev. B,* 2011, 84, 0451151-04511510.) Density Functional Theory (DFT) was used to calculate the energy of each Li-M-O compound and its Na-M-O and H-M-O analogs. These analogs were constructed by substituting all Li atoms in the compound with Na or H atoms, respectively. DFT calculations were run with structural relaxation of all cell-internal atom positions and cell-external lattice vectors. DFT calculations were performed using the Vienna Ab-initio Simulation Package (VASP) and the PBE exchange-correlation functional with parameters consistent with those described previously for OQMD. (See, S. Grindy, B. Meredig, S. Kirklin, J. E. Saal and C. Wolverton, *Phys. Rev. B,* 2013, 87, 075150; J. Perdew, K. Burke and M. Ernzerhof, *Phys. Rev. Lett.,* 1996, 77, 3865-3868; P. E. Blöchl, *Phys. Rev. B,* 1994, 50, 17953-17979; G. Kresse and D. Joubert, *Phys. Rev. B,* 1999, 59, 1758-1774; G. Kresse and J. Hafner, *Phys. Rev. B,* 1993, 47, 558-561; G. Kresse and J. Hafner, *Phys. Rev. B,* 1994, 49, 14251-14269; G. Kresse and J. Furthmüller, *Comput. Mater. Sci.,* 1996, 6, 15-50; G. Kresse and J. Furthmüller, *Phys. Rev. B,* 1996, 54, 11169-11186; V. I. Anisimov, J. Zaanen and O. K. Andersen, *Phys. Rev. B,* 1991, 44, 943-954; V. Anisimov, I. Solovyev, M. Korotin, M. Czyżyk and G. Sawatzky, *Phys. Rev. B,* 1993, 48, 16929-16934; A. Liechtenstein, V. Anisimov and J. Zaanen, *Phys. Rev. B,* 1995, 52, 5467-5470; S. L. Dudarev, G. A. Botton, S. Y. Savrasov, C. J. Humphreys and A. Sutton, *Phys. Rev. B,* 1998, 57, 1505-1509.) These DFT parameters included an energy cutoff of 520 eV and 8,000 k-points per reciprocal atom. All reaction energies at standard temperature and pressure (STP) were calculated. $H_2$, $O_2$, and $H_2O$ free energies at STP were determined using enthalpy and entropy values from the JANAF Thermochemical Tables. (See, M. W. Chase, C. A. Davies, J. F. Downey, D. J. Frurip, R. A. McDonald and A. N. Syverud, *National Institute of Standards and Technology: JANAF Thermochemical Tables,* 1985.) For solid compounds, it was assumed that STP free energies were equal to 0 K enthalpies. The stabilities of Li-M-O compounds were calculated with respect to the stable ground state in the OQMD. These stabilities were used as an indication that the compounds could be synthesized in their lithiated states. All Li-M-O compounds that were unstable by more than 0.1 eV/atom were excluded from the search. At chemical compositions with multiple polymorphs, only the crystal structure with lowest energy at that composition was included.

Standard electrode potentials and specific ion interaction theory (SIT) were used to determine chemical potentials of alkali metals (i=Li, Na) in various brines, seawater, and HCl solutions. Chemical potentials of the pure elements ($\mu_i^0$) were calculated using DFT. Chemical potentials were determined in standard state aqueous solutions ($\mu_i^{std}$) by adding the standard electrode potentials $$(E_i^0): \mu_i^{std} = \mu_i^0 + E_i^0 \tag{1}$$

Chemical potentials were then calculated in non-standard solutions by taking the activity ($a_i$) into account:

$$\mu_i = \mu_i^{std} + k_B T * \ln(a_i) \tag{2}$$

The activity of an ion in solution can be calculated as:

$$a_i = \gamma_i * m_i \tag{3}$$

where $\gamma_i$ is the activity coefficient and $m_i$ is the molality of a species. The Brønsted-Guggenheim-Scatchard specific ion interaction model was used to approximate the activity coefficients from concentration data. (See, C. Bretti, C. Foti, N. Porcino and S. Sammartano, *J Solution Chem,* 2006, 35, 1401-1415.) This model describes electrolyte solutions using ionic interaction coefficients that are independent of concentration. The activity coefficients were determined as follows:

$$\log \gamma_i = -z_i^2 D + \sum_k \varepsilon(i, k) m_k \tag{4}$$

$$D = \frac{A\sqrt{I_m}}{1 + 1.5\sqrt{I_m}} \tag{5}$$

Here, $z_i$ is the charge of the ionic species i, D is the Debye-Huckel factor, $I_m$ is the ionic strength of the solution, A is a constant (0.509), and k sums over all species in solution. The constant A and the interaction coefficients, $\varepsilon(i, k)$, were taken from a study by Grenthe et al., where they were listed for solutions with high ionic strength. I. Grenthe, A. Plyasunov and K. Spahiu, in *Modeling in Aquatic Chemistry*, OECD Publications, 1997, pp. 325-426. $\varepsilon(i, k)$ is zero for ions of the same sign. $\varepsilon(i, k)$ for $H^+$, $Li^+$, and $Na^+$ with $Cl^-$ are 0.12, 0.10, and 0.03 kg/mol, respectively. $\varepsilon(i, k)$ for $Li^+$ and $Na^+$ with $SO_4^{2-}$ are −0.03 and −0.12 kg/mol, respectively. Molalities and ionic strengths were determined using solute concentrations for brines from An et al. and for seawater from the CRC handbook. J. W. (See, An, D. J. Kang, K. T. Tran, M. J. Kim, T. Lim and T. Tran, *Hydrometallurgy,* 2012, 117-118, 64-70; and D. Lide, *CRC Handbook of Chemistry and Physics:* 86th Edition, 2005.) For brines and seawater, the pH was set to 8.0; and for HCl solutions, pH was set to 0.0.

Reaction energies for Li—H and Li—Na ion exchange were calculated using DFT energies and aqueous chemical potentials. The following general reaction was considered for Li—H ion exchange:

$$HM_xO_y + Li^{aq} \rightarrow LiM_xO_y + H^{aq} \tag{6}$$

The free energy of the above reaction for a compound in a standard state solution (std) is:

$$\Delta G_{Li-H}^{std} = E[LiM_xO_y] - E[HM_xO_y] + \mu_H^{std} - \mu_{Li}^{std} \tag{7}$$

For a non-standard solution, the reaction energy also depends on the activities of Li ($a_{Li}$) and H ($a_H$):

$$\Delta G_{Li-H} = \Delta G_{Li-H}^{std} + k_B T * \ln\left(\frac{a_H}{a_{Li}}\right) \tag{8}$$

When this reaction energy is negative for a compound in a solution, the compound will selectively absorb Li relative to H. When this reaction energy is positive, the compound will selectively absorb H. To plot the range of solutions wherein a particular compound will selectively absorb Li relative to H, $\Delta G_{Li-H}$ was set equal to zero and the Li activity threshold was calculated for Li—H ion exchange:

$$a_{Li}^{t;Li-H} = a_H * e^{-\frac{\Delta G_{Li-H}^{std}}{k_B T}} \quad (9)$$

When a solution has a Li activity that is above this threshold $$a_{Li} > a_{Li}^{t;Li-H}$$

the compound will selectively absorb Li relative to H. When a solution has a Li activity that is below this threshold $$a_{Li} < a_{Li}^{t;Li-H}$$

the compound will selectively absorb H.

A similar reaction was considered for Li—Na ion exchange:

$$Na_xM_yO_z + Li^{aq} \rightarrow Li_xM_yO_z + Na^{aq} \quad (10)$$

The free energy of the above reaction for a compound in a non-standard solution is:

$$\Delta G_{Li-Na} = \Delta G_{Li-Na}^{std} + k_B T * \ln\left(\frac{a_{Na}}{a_{Li}}\right) \quad (11)$$

To plot the range of solutions wherein a particular compound will selectively absorb Li relative to Na, the activity threshold for Li—Na ion exchange was calculated:

$$a_{Li}^{t;Li-Na} = a_{Na} * e^{-\frac{\Delta G_{Li-Na}^{std}}{k_B T}} \quad (12)$$

When a solution has a Li activity that is above this threshold $$a_{Li} > a_{Li}^{t;Li-Na}$$

the compound will selectively absorb Li relative to Na. When a solution has a Li activity that is below this threshold $$a_{Li} < a_{Li}^{t;Li-Na}$$

the compound will selectively absorb Na.

Twelve brines from around the world were considered: Bonneville, Clayton Valley, Dead Sea, Great Salt Lake, Hombre Muerto, Salar de Atacama, Salar de Uyuni, Salton Sea, Searles Lake, Sua Pan, Taijinaier, and Zabuye. These brines were conveniently tabulated by An et al. with concentration data for Na, K, B, Li, Mg, Ca, Cl, and SO$_4$ species. (See, J. W. An, D. J. Kang, K. T. Tran, M. J. Kim, T. Lim and T. Tran, *Hydrometallurgy*, 2012, 117-118, 64-70.) This list includes brines that are commercially developed, such as Salar de Atacama, and also includes undeveloped brines with a broad range of Li and Na concentrations. For acid elution, two different HCl solutions were considered. These acids were fixed to pH=0, and they were further defined according to LiCl:HCl molar ratios in solution at equilibrium. For one acid, a 10:1 ratio of LiCl:HCl was assumed, which represents a case of elution with a small excess of acid. For the other acid, a 1:10 ratio of LiCl:HCl was assumed, which represents a large excess of acid.

For a compound to be promising for Li extraction, the activity thresholds of the compound for Li—H and Li—Na exchange should fall in appropriate target windows. These targets were defined to identify materials that can selectively absorb Li from brine and then elute the Li in acid. The Salar de Atacama brine is the richest Li resource that was considered, and the LiCl:HCl=1:10 solution is the strongest acid. These solutions were used to define targets for Li—H and Li—Na ion exchange. Alternative targets for seawater were also defined by substituting seawater in place of Salar de Atacama. Seawater is a more stringent condition for Li adsorption due to the very low concentration of Li in seawater. For all target windows, a margin of 0.1 eV/Li on the reaction energy of ion exchange was included to account for uncertainties in brine concentrations, SIT models, and DFT energies. Materials that met targets for both Li—H and Li—Na exchange were identified as promising for Li extraction.

Seventy-seven Li-M-O (M=Al, B, Cu, Fe, Ga, Ge, Mn, Sc, Si, Sn, Ti, V, Y, Zn, Zr) compounds were identified that were stable or within 0.1 eV/atom of the stable ground state. 44 of these 77 compounds were stable. The elements (M) were divided into two groups. For the first group (M=Al, Cu, Mn, Sn, Ti, and V), each of these elements formed at least one compound that met the targets for Li—H and Li—Na exchange, and each element was relatively low cost. FIGS. 1, 2, 3, 4, 5, 6, 7, 8, 9, 10, 11, and 12 show activity thresholds for Li—H and Li—Na exchange for these compounds. These activity thresholds are given in Equations 9 and 12 for Li—H and Li—Na exchange, respectively. In FIGS. 1-12, the activity thresholds are represented by lines, which are solid for Li-M-O compounds that are stable and are dashed for Li-M-O compounds within 0.1 eV/atom of the stable ground state. The activities of brine, seawater, and HCl solutions are plotted as points. The plots in FIG. 1 to FIG. 6, show activity thresholds for Li—H exchange. In these figures, if a material has a threshold below a brine, then the material will selectively absorb Li from that brine while releasing H. If a material has a threshold above an acid solution, then the material will selectively absorb H from that acid while releasing Li. The plots in FIGS. 7 to 12 show activity thresholds for Li—Na ion exchange. In these plots, if a material has a threshold below a brine, then the material will selectively absorb Li from that brine relative to Na.

For the second group of elements (M=B, Fe, Ga, Ge, Sc, Si, Y, Zn, and Zr), the elements either did not form materials that met both targets (B, Fe, Sc, Si, Y, Zn) or were too expensive for large-scale extraction (Ga, Ge).

Figure 13:
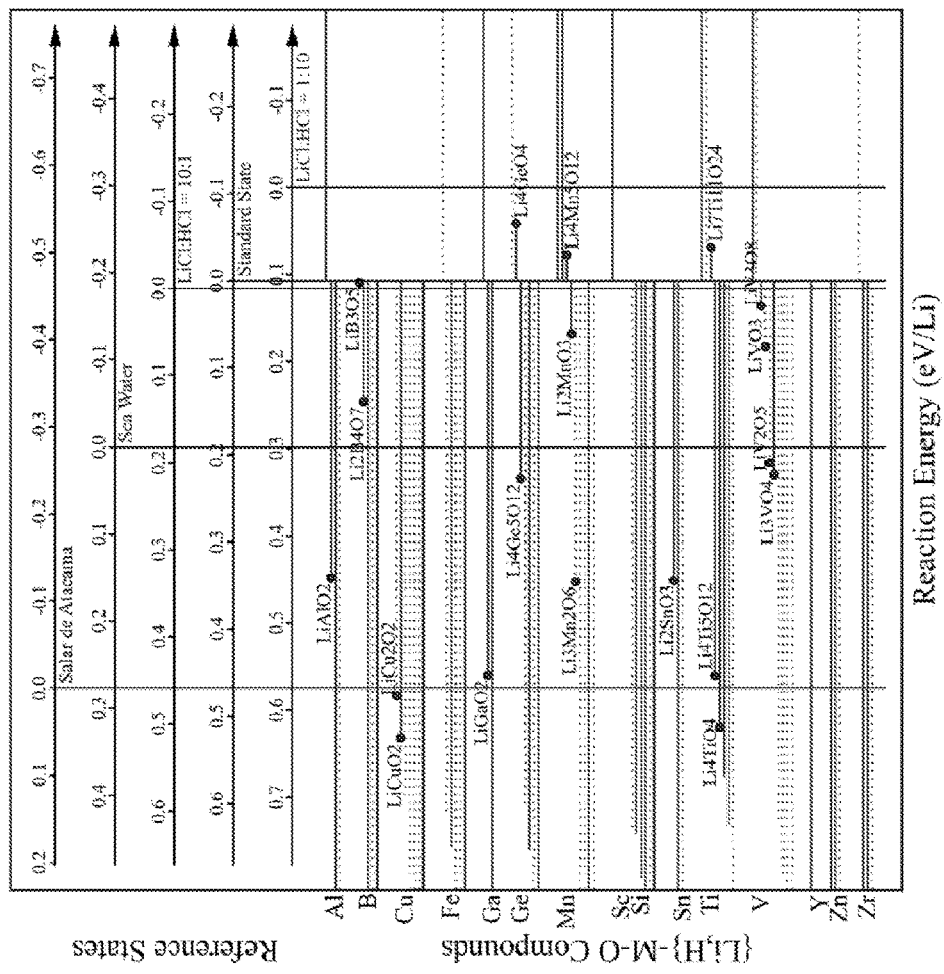
FIG. 13. Graph of reaction energies of ion exchange from H to Li for {Li,H}-M-O compounds in equilibrium with standard state, Salar de Atacama brine, seawater, and HCl solutions. At the top of the figure, horizontal axes demarcate the reaction energies for each solution. Negative energies indicate Li selectivity, and positive energies indicate H selectivity. Each compound is marked with a horizontal line, which is solid for Li-M-O compounds that are stable and is dashed for Li-M-O compounds that are within 0.1 eV/atom of the stable ground state. All compounds that lie in the reaction energy target window between the Salar de Atacama brine and the LiCl:HCl=1:10 solution, including a 0.1 eV/Li margin of error, are labeled with a dot.

FIG. 13 shows reaction energies for Li—H exchange. At the top of the figure, horizontal axes demarcate the reaction energies for standard state, Salar de Atacama brine, seawater, and HCl solutions. Negative energies indicate Li selectivity, and positive energies indicate H selectivity. Compounds hit the target for Li—H exchange if they exhibit negative energies for Salar de Atacama and positive energies for the LiCl:HCl=1:10 solution, within a 0.1 eV/Li margin of error. Compounds that hit the target are marked with a dot and labeled. 19 compounds hit this Li—H exchange target: LiAlO$_2$, Li$_2$B$_4$O$_7$, LiB$_3$O$_5$, LiCuO$_2$, LiCu$_2$O$_2$, LiGaO$_2$, Li$_4$Ge$_5$O$_{12}$, Li$_4$GeO$_4$, Li$_3$Mn$_2$O$_6$, Li$_2$MnO$_3$, Li$_4$Mn$_5$O$_{12}$, Li$_2$SnO$_3$, Li$_4$TiO$_4$, Li$_4$Ti$_5$O$_{12}$, Li$_7$Ti$_{11}$O$_{24}$, Li$_3$VO$_4$, LiV$_2$O$_5$, LiVO$_3$, and LiV$_3$O$_8$.

Figure 14:
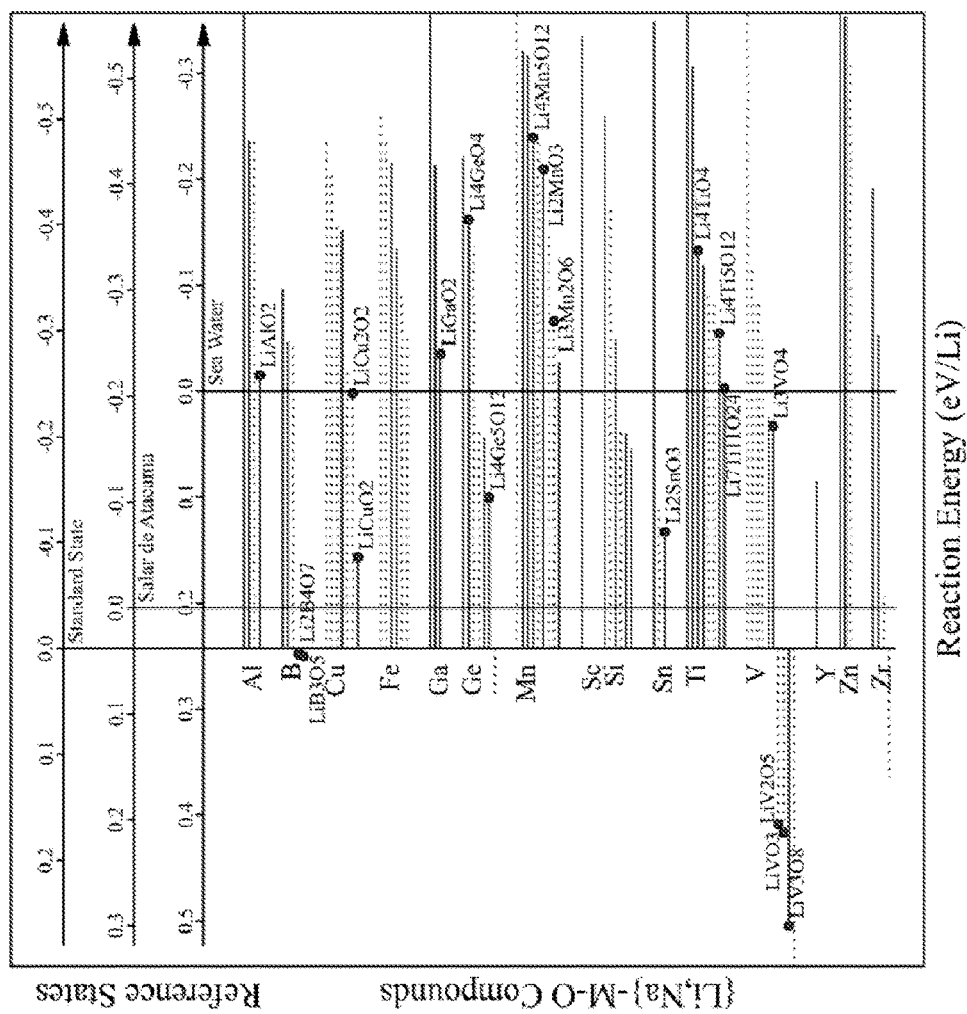
FIG. 14. Graph of reaction energies of ion exchange from Na to Li for {Li,Na}-M-O compounds in equilibrium with standard state, Salar de Atacama brine, and seawater solutions. At the top of the figure, horizontal axes demarcate the reaction energies for each solution. Negative energies indicate Li selectivity, and positive energies indicate Na selectivity. Compounds that exhibit negative energies for Salar de Atacama are considered to hit the target for Li—Na exchange. Each compound is marked with a horizontal line, which is solid for Li-M-O compounds that are stable and is dashed for Li-M-O compounds that are within 0.1 eV/atom of the stable ground state. All compounds that hit the target for Li—H ion exchange (FIG. 13) are labeled with a dot.

FIG. 14 shows reaction energies for Li—Na exchange. At the top of the figure, horizontal axes demarcate the reaction energies for standard state, Salar de Atacama brine, and seawater solutions. Negative energies indicate Li selectivity, and positive energies indicate Na selectivity. Compounds that exhibit negative energies for Salar de Atacama are considered to hit our target for Li—Na exchange. All compounds that met the Li—H target in FIG. 13 are also marked in FIG. 14. $Li_2B_4O_7$, $LiB_3O_5$, $LiV_2O_5$, $LiVO_3$, and $LiV_3O_8$ hit the Li—H target but do not hit the Li—Na target. Fourteen compounds hit targets for both Li—H and Li—Na exchange: $LiAlO_2$, $LiCuO_2$, $LiCu_2O_2$, $LiGaO_2$, $Li_4Ge_5O_{12}$, $Li_4GeO_4$, $Li_3Mn_2O_6$, $Li_2MnO_3$, $Li_4Mn_5O_{12}$, $Li_2SnO_3$, $Li_4TiO_4$, $Li_4Ti_5O_{12}$, $Li_7Ti_{11}O_{24}$, and $Li_3VO_4$.

The 14 compounds that hit the Li—H and Li—Na targets were attractive in terms of ion exchange thermodynamics. However, these compounds could be screened further. $LiGaO_2$, $Li_4Ge_5O_{12}$, and $Li_4GeO_4$ contain expensive elements that are not desirable for large-scale industrial applications. $Li_3Mn_2O_6$ and $LiCu_2O_2$ are not stable. This left nine compounds that are the most useful for large-scale Li extraction from brines: $LiAlO_2$, $LiCuO_2$, $Li_2MnO_3$, $Li_4Mn_5O_{12}$, $Li_2SnO_3$, $Li_4TiO_4$, $Li_4Ti_5O_{12}$, $Li_7Ti_{11}O_{24}$, and $Li_3VO_4$. Applying the more stringent targets for seawater, four compounds were particularly well suited for Li extraction from seawater: $Li_2MnO_3$, $Li_4Mn_5O_{12}$, $Li_7Ti_{11}O_{24}$, and $Li_3VO_4$.

The list of nine materials includes one of the top-performing ion exchange materials for lithium extraction in the literature: $Li_4Mn_5O_{12}$. (See, R. Chitrakar, Y. Makita, K. Ooi and A. Sonoda, Chem. Lett., 2012, 41, 1647-1649.) This finding validates the model's ability to identify attractive materials. The other top-performers in the literature are $Li_{1.6}Mn_{1.6}O_4$ and $Li_2TiO_3$. R. (See, Chitrakar, Y. Makita, K. Ooi and A. Sonoda, Dalton Trans., 2014, 43, 8933; and R. Chitrakar, Y. Makita, K. Ooi and A. Sonoda, Chem. Lett., 2012, 41, 1647-1649.) $Li_{1.6}Mn_{1.6}O_4$ is very close to $Li_4Mn_5O_{12}$ in stoichiometry but is not available in the OQMD database because the structure has not been fully characterized and is highly disordered. $Li_2TiO_3$ appears in the dataset and is very close to our Li—H exchange target window. In the Salar de Atacama brine, $Li_2TiO_3$ exhibits a reaction energy of 0.101 eV/Li for Li—H exchange. The target reaction energy was <0.0 eV/Li with a 0.1 eV/Li margin of error, so $Li_2TiO_3$ missed the screen by only 0.001 eV/Li. Nonetheless, it was predicted that $Li_2TiO_3$ would lack selectivity for Li relative to H in the Salar de Atacama brine. Li absorption in Salar de Atacama could be improved for $Li_2TiO_3$ by increasing the pH of the brine. If the pH of Salar de Atacama were increased to 10 in the model, then $Li_2TiO_3$, $LiTiO_2$, $Li_2FeO_3$, and $Li_2Si_3O_7$ would also meet the targets for brine extraction. Such a decrease in pH can be achieved through addition of NaOH to the brine prior to the ion exchange process. This NaOH could also neutralize hydrogen ions that are released during ion exchange, facilitating disposal into the environment.

Physical understanding about ion exchange materials can be gained by analyzing the trends in the list of nine compounds that are most useful for brine extraction. Two of the compounds contain Mn—$Li_2MnO_3$ and $Li_4Mn_5O_{12}$—and both of these Mn compounds exhibit $Mn^{4+}$ nominal charges. This suitability of compounds with a 4+ charge on the metal extends beyond Mn to also include Sn and Ti. $Li_2MnO_3$, $Li_2SnO_3$, and $Li_2TiO_3$ share the same C2/m space group. $Li_4TiO_4$ also exhibits a 4+ charge on Ti, and $Li_7Ti_{11}O_{24}$ exhibits an average nominal charge of 3.7+. Other $M^{4+}$ compounds qualified as useful when brine pH was set to 10 ($Li_2TiO_3$, $Li_2FeO_3$, and $Li_2Si_3O_7$) or were only excluded due to cost ($Li_4Ge_5O_{12}$ and $Li_4GeO_4$). It is not obvious why $M^{4+}$ compounds are common among promising ion exchange materials. The strong electrostatic attraction between $M^{4+}$ and $O^{2-}$ atoms may be responsible for creating $Li^+$ sites that are suitable for Li—H and Li—Na exchange targets.

Conclusions

Density functional theory and specific ion interaction theory were used to identify ion exchange materials for lithium extraction from brines and seawater. Seventy-seven stable or nearly stable Li-M-O compounds were considered from the Open Quantum Materials Database. It was found that most of these compounds are not suitable for lithium extraction because they either bind Li in both brine and acid, or bind H in both brine and acid. Fourteen compounds were identified that bind H in acid and bind Li in brine with selectivity relative to Na. Three of these compounds contain expensive Ga or Ge, and two of these compounds are not stable. The remaining nine compounds are the most suitable for large-scale Li extraction from brines: $LiAlO_2$, $LiCuO_2$, $Li_2MnO_3$, $Li_4Mn_5O_{12}$, $Li_2SnO_3$, $Li_4TiO_4$, $Li_4Ti_5O_{12}$, $Li_7Ti_{11}O_{24}$, and $Li_3VO_4$. Four additional compounds become viable when the pH of the brine is adjusted to 10: $Li_2TiO_3$, $LiTiO_2$, $Li_2FeO_3$, and $Li_2Si_3O_7$. Four compounds are also promising for Li extraction from seawater: $Li_2MnO_3$, $Li_4Mn_5O_{12}$, $Li_7Ti_{11}O_{24}$, and $Li_3VO_4$.

Example 2

This example describes lithium metal phosphate ("L-M-P—O") compounds that can be used for lithium extraction via the above-described methods. These phosphate materials were evaluated using the same computational methods described in Example 1.

Figure 15:
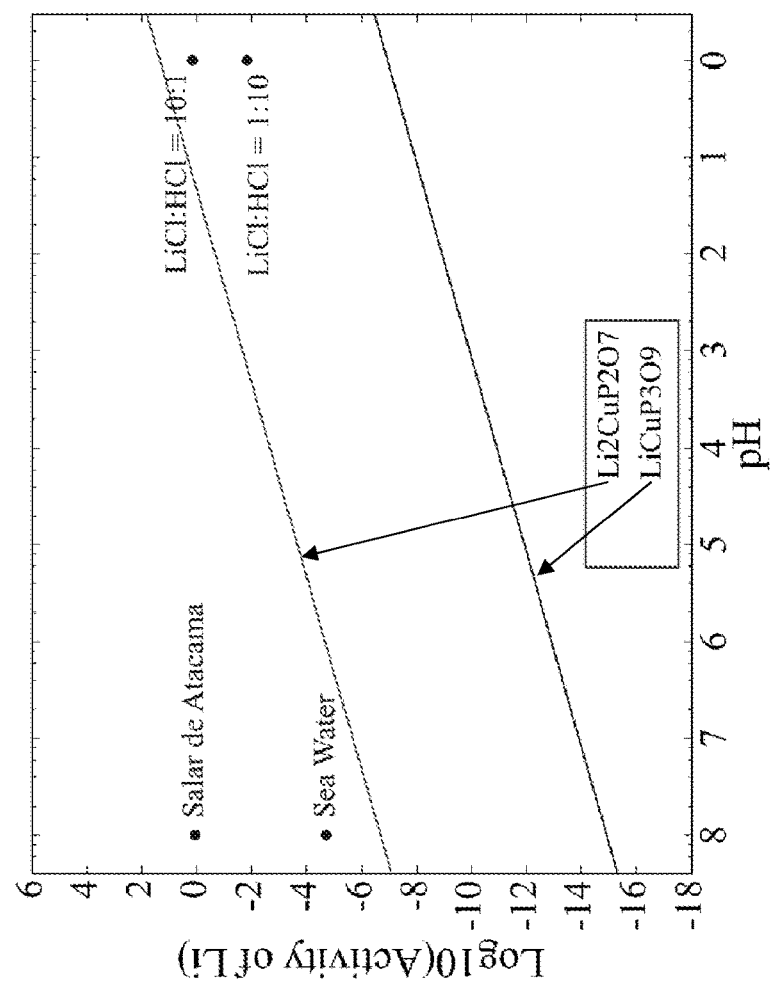
FIG. 15. Graph of the activity thresholds for Li—H ion exchange for $Li_2CuP_2O_7$ and $LiCuP_3O_9$ compounds in equilibrium with brine, seawater, and HCl solutions.
Figure 16:
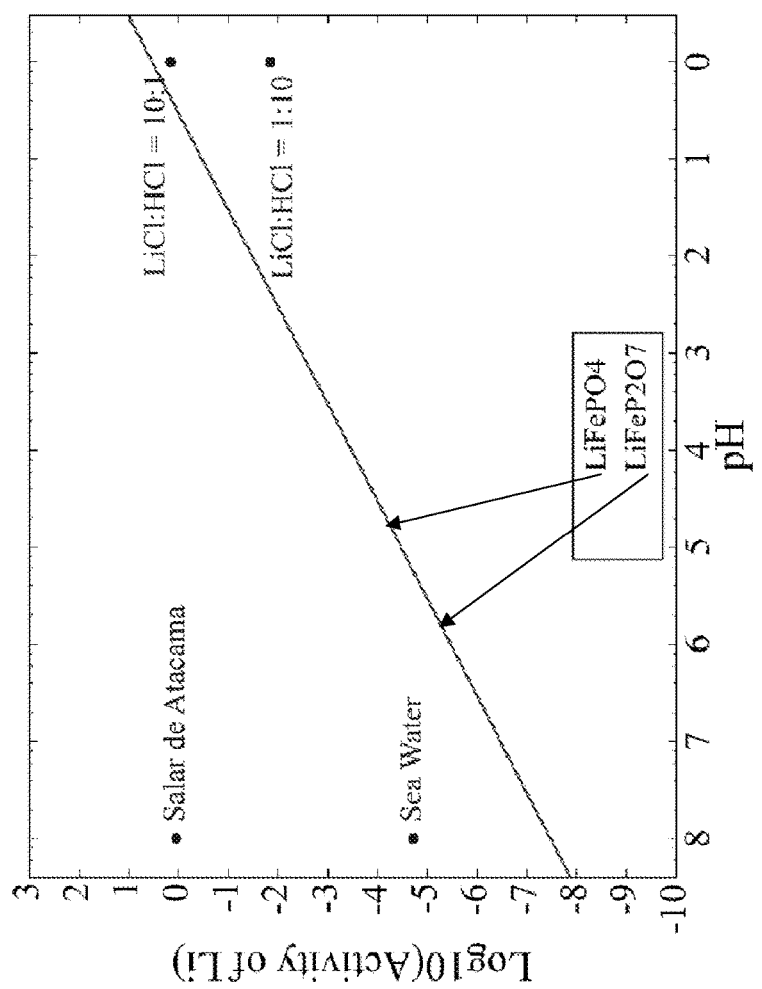
Figure 17:
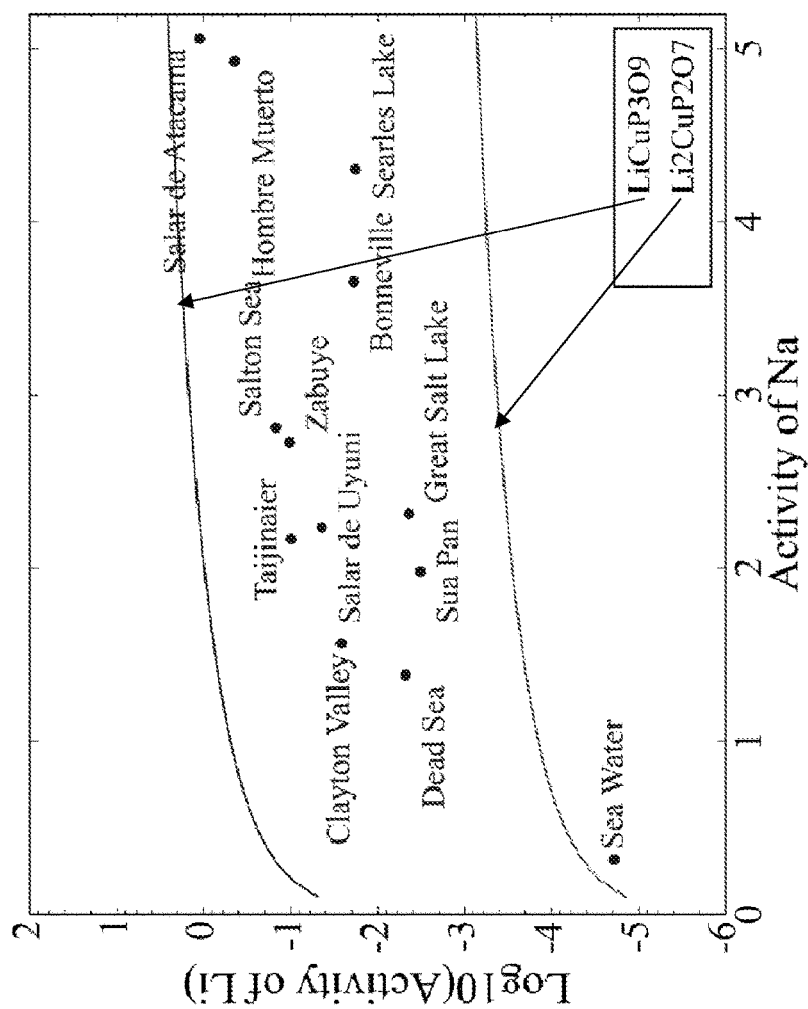
FIG. 17. Graph of the activity thresholds for Li—Na ion exchange for $Li_2CuP_2O_7$ and $LiCuP_3O_9$ compounds in equilibrium with brine and seawater.
Figure 18:
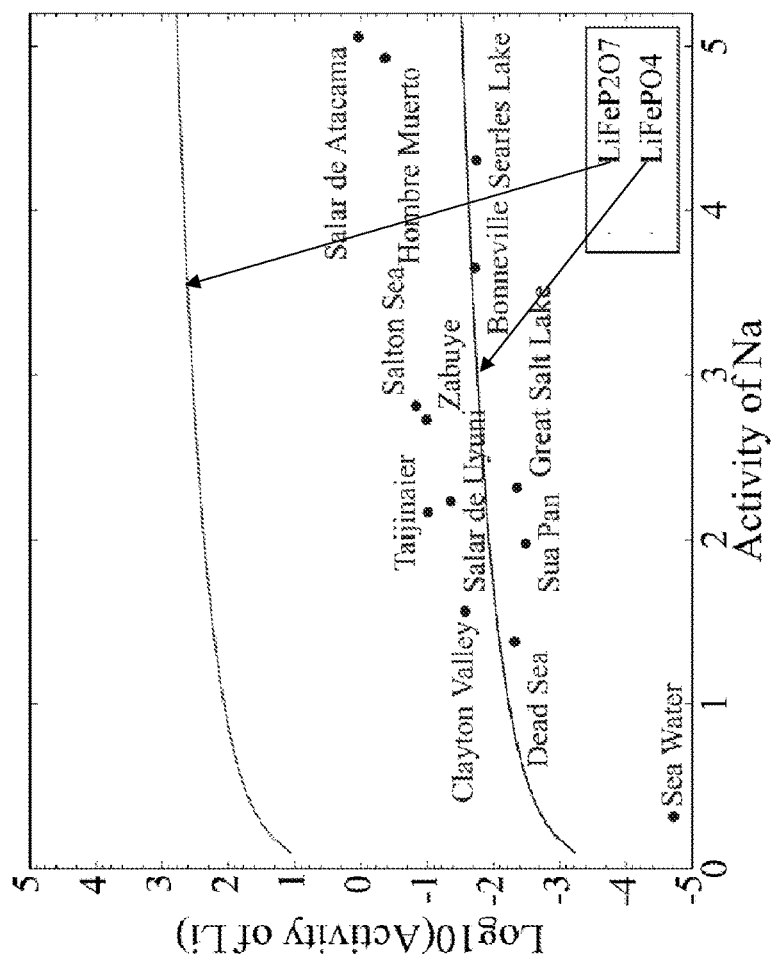

$LiFePO_4$ and $Li_2CuP_2O_7$ were identified as useful ion exchange materials for extracting lithium from brines and seawater. These two materials meet the thermodynamic targets for Li—H and Li—Na exchange that are required to enable lithium extraction from brines and seawater. FIGS. 15, 16, 17, and 18 show the activity thresholds for ion exchange in $LiFePO_4$ and $Li_2CuP_2O_7$ as well as other compounds in the Li—Cu—P—O and Li—Fe—P—O systems. FIGS. 15 and 16 show reaction energies of Li—H and Li—Na exchange for $LiFePO_4$, $Li_2CuP_2O_7$ and a variety of Li-M-P—O materials.

Figure 19:
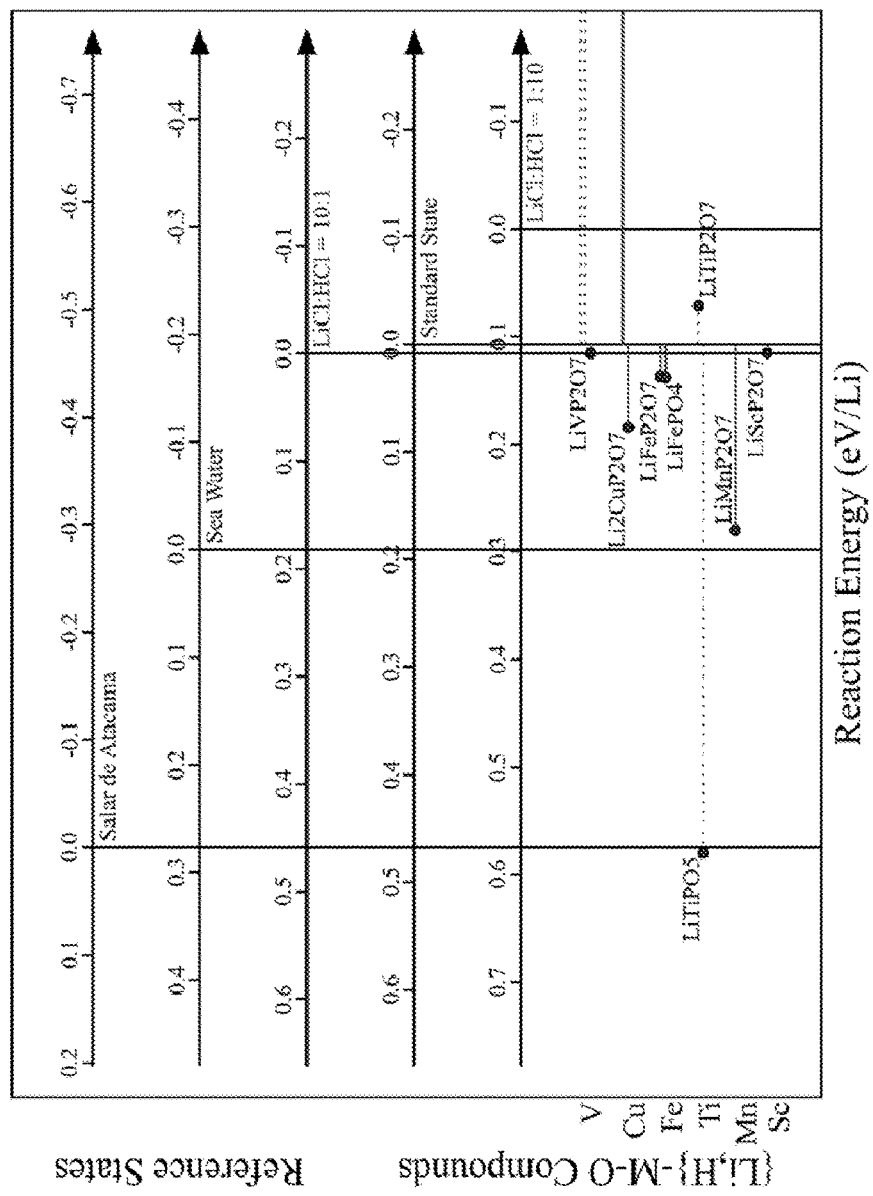
FIG. 19. Graph of reaction energies of ion exchange from H to Li for {Li,H}-M-P—O compounds in equilibrium with standard state, Salar de Atacama brine, seawater, and HCl solutions. At the top of the figure, horizontal axes demarcate the reaction energies for each solution. Negative energies indicate Li selectivity, and positive energies indicate H selectivity. Each compound is marked with a horizontal line, which is solid for Li-M-P—O compounds that are stable and is dashed for Li-M-P—O compounds that are within 0.1 eV/atom of the stable ground state. All compounds that lie in the reaction energy target window between the Salar de Atacama brine and the LiCl:HCl=1:10 solution, including a 0.1 eV/Li margin of error, are labeled with a dot.
Figure 20:
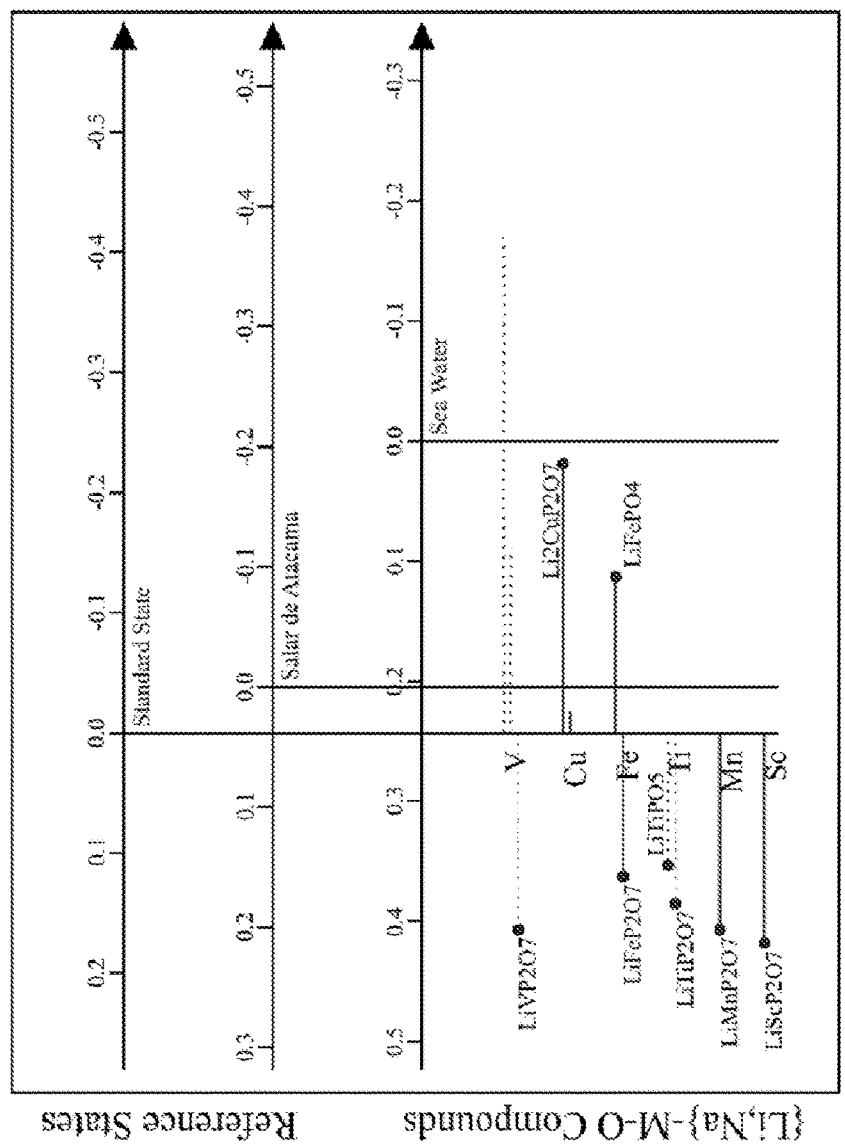
FIG. 20. Graph of reaction energies of ion exchange from Na to Li for {Li,Na}-M-P—O compounds in equilibrium with standard state, Salar de Atacama brine, and seawater solutions. At the top of the figure, horizontal axes demarcate the reaction energies for each solution. Negative energies indicate Li selectivity, and positive energies indicate Na selectivity. Compounds that exhibit negative energies for Salar de Atacama are considered to hit the target for Li—Na exchange. Each compound is marked with a horizontal line, which is solid for Li-M-P—O compounds that are stable and is dashed for Li-M-P—O compounds that are within 0.1 eV/atom of the stable ground state. All compounds that hit the target for Li—H ion exchange (FIG. 19) are labeled with a dot.

FIG. 19. Graph of reaction energies of ion exchange from H to Li for {Li,H}-M-P—O compounds in equilibrium with standard state, Salar de Atacama brine, seawater, and HCl solutions. At the top of the figure, horizontal axes demarcate the reaction energies for each solution. Negative energies indicate Li selectivity, and positive energies indicate H selectivity. Each compound is marked with a horizontal line, which is solid for Li-M-P—O compounds that are stable and is dashed for Li-M-P—O compounds that are within 0.1 eV/atom of the stable ground state. All compounds that lie in the reaction energy target window between the Salar de Atacama brine and the LiCl:HCl=1:10 solution, including a 0.1 eV/Li margin of error, are labeled with a dot. FIG. 19 shows a graph of the reaction energies of ion exchange from H to Li for {Li,H}-M-P—O compounds in equilibrium with standard state, Salar de Atacama brine, seawater, and HCl solutions. FIG. 20 shows a graph of the reaction energies of ion exchange from Na to Li for {Li,Na}-M-P—O compounds in equilibrium with standard state, Salar de Atacama brine, and seawater solutions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for extracting lithium from a solution, the method comprising:
   contacting a hydrogenated cation exchange material with a sample solution comprising lithium cations, whereby lithium cations undergo cation exchange with hydrogen in the hydrogenated cation exchange material to form a lithiated cation exchange material;
   contacting the lithiated cation exchange material with an acidic solution, whereby hydrogen ions in the acidic solution undergo cation exchange with lithium in the lithiated cation exchange material, thereby regenerating the hydrogenated cation exchange material and releasing lithium ions into the acidic solution; and
   separating the released lithium ions from the acidic solution, wherein the lithiated cation exchange material comprises $Li_4TiO_4$, $Li_7Ti_{11}O_{24}$, $LiTiO_2$, $LiAlO_2$, $LiCuO_2$, $Li_2SnO_3$, $Li_2FeO_3$, $Li_3VO_4$, $Li_2Si_3O_7$, $LiFePO_4$, $Li_2CuP_2O_7$, $Li_4Ge_5O_{12}$, $Li_4GeO_4$, layered $Li_2MnO_3$, or a mixture of two or more thereof.

2. The method of claim 1, wherein the lithiated cation exchange material comprises $Li_4TiO_4$, $Li_7Ti_{11}O_{24}$, $LiTiO_2$, or a mixture of two or more thereof.

3. The method of claim 1, wherein the lithiated cation exchange material comprises $Li_2SnO_3$, $Li_2FeO_3$, or a mixture thereof.

4. The method of claim 1, wherein the lithiated cation exchange material comprises $LiAlO_2$, $LiCuO_2$, or a mixture thereof.

5. The method of claim 1, wherein the lithiated cation exchange material comprises $LiFePO_4$, $Li_2CuP_2O_7$, or a mixture thereof.

6. The method of claim 1, wherein the lithiated cation exchange material comprises $Li_3VO_4$.

7. The method of claim 1, wherein the lithiated cation exchange material comprises $Li_2Si_3O_7$.

8. The method of claim 1, wherein the lithiated cation exchange material comprises $Li_4Ge_5O_{12}$, $Li_4GeO_4$, or a mixture thereof.

9. The method of claim 1, wherein the sample solution has a pH of 7 or higher.

10. The method of claim 1, wherein the sample solution has a pH of 8 or higher.

11. The method of claim 1, wherein the sample solution has a pH of 10 or higher.

12. The method of claim 1, wherein the sample solution is a brine.

13. The method of claim 1, wherein the sample solution is salt water from a natural body of salt water.

14. The method of claim 1, wherein separating the released lithium ions from the acidic solution comprises forming a lithium salt and separating the lithium salt from the acidic solution.

15. The method of claim 1, wherein the acidic solution comprises hydrochloric acid.

16. The method of claim 1, wherein the acidic solution comprises sulfuric acid, phosphoric acid, hydrobromic acid, chloric acid, perchloric acid, nitric acid, formic acid, acetic acid, or combinations of two or more thereof.

17. The method of claim 1, wherein the sample solution has a lithium ion concentration of at least 0.1 ppm.

18. The method of claim 2, wherein the lithiated cation exchange material comprises $Li_4TiO_4$.

19. The method of claim 2, wherein the lithiated cation exchange material comprises $Li_7Ti_{11}O_{24}$.

20. The method of claim 2, wherein the lithiated cation exchange material comprises $LiTiO_2$.

* * * * *